(12) United States Patent
DeSalle et al.

(10) Patent No.: US 10,498,905 B2
(45) Date of Patent: Dec. 3, 2019

(54) SELF-POWERED CLOUD-BASED WIRELESS STATE-CHANGE NOTIFIER

(71) Applicant: Net Irrigate, LLC, Bloomington, IN (US)

(72) Inventors: George DeSalle, Fort Myers, FL (US); Edward DeSalle, Bloomington, IN (US)

(73) Assignee: Net Irrigate, LLC, Bloomington, IN (US)

( * ) Notice: Subject to any disclaimer, the term of this patent is extended or adjusted under 35 U.S.C. 154(b) by 426 days.

(21) Appl. No.: 15/359,719

(22) Filed: Nov. 23, 2016

(65) Prior Publication Data

US 2017/0148280 A1 May 25, 2017

Related U.S. Application Data

(60) Provisional application No. 62/258,742, filed on Nov. 23, 2015.

(51) Int. Cl.
| | |
|---|---|
| *G08B 1/08* | (2006.01) |
| *H04W 4/14* | (2009.01) |
| *H04M 11/04* | (2006.01) |
| *H04L 12/58* | (2006.01) |
| *H04W 84/18* | (2009.01) |

(Continued)

(52) U.S. Cl.
CPC .......... *H04M 11/04* (2013.01); *H04L 51/046* (2013.01); *H04W 4/14* (2013.01); *H04L 67/10* (2013.01); *H04W 84/042* (2013.01); *H04W 84/18* (2013.01)

(58) Field of Classification Search
CPC ...... H04L 51/046; H04L 67/10; H04M 11/04; H04W 4/14; H04W 84/042; H04W 84/18; G08B 25/08; G08B 25/14; G06F 11/0748
USPC ......... 702/188, 189; 370/313; 340/506, 679, 340/870.06; 455/11.1, 27.1, 403; 169/61; 327/1
See application file for complete search history.

(56) References Cited

U.S. PATENT DOCUMENTS 5,207,276 A * 5/1993 Scofield ................. A62C 3/006
169/61
5,732,074 A * 3/1998 Spaur ..................... G07C 5/008
370/313

(Continued)

*Primary Examiner* — John H Le
(74) *Attorney, Agent, or Firm* — Woodard, Emhardt, Henry, Reeves & Wagner, LLP; William McKenna; Jeremy Gustrowsky

(57) ABSTRACT

An event driven monitoring device that can be configured to monitor a variety of operating conditions for a piece of equipment or system and may also report specific events related to these operating conditions to a central cloud-based server. The server can then broadcast customized alert information to other computers or systems configured to receive them. The monitoring device may accept input from many types of sensors allowing the device to detect and respond to changes in numerous types of sense parameters. Individuals and/or devices may receive reports from the remote server in response to certain events sent using any suitable protocol such as a text message, e-mail, push notification, or automated telephone call to name a few examples. The server may be configured with specialized rules programmed to determine which contacts should be notified for specific events related to individual pieces of equipment.

9 Claims, 8 Drawing Sheets

(51) Int. Cl.
    *H04W 84/04*    (2009.01)
    *H04L 29/08*    (2006.01)

(56) References Cited

U.S. PATENT DOCUMENTS

| | | | | |
|---|---|---|---|---|
| 5,983,073 | A * | 11/1999 | Ditzik | G06F 1/1616 |
| | | | | 455/11.1 |
| 6,437,691 | B1 * | 8/2002 | Sandelman | G06F 11/0748 |
| | | | | 340/506 |
| 6,646,564 | B1 * | 11/2003 | Azieres | G08B 25/14 |
| | | | | 340/506 |
| 7,103,511 | B2 * | 9/2006 | Petite | G05B 23/0208 |
| | | | | 340/870.06 |
| 2006/0111058 | A1 * | 5/2006 | Grant | H04M 3/42 |
| | | | | 455/127.1 |
| 2011/0241871 | A1 | 10/2011 | Durio | |
| 2013/0099931 | A1 * | 4/2013 | Wetherill | F04B 49/06 |
| | | | | 340/606 |
| 2016/0131696 | A1 * | 5/2016 | Forster | G01R 31/007 |
| | | | | 327/1 |

* cited by examiner

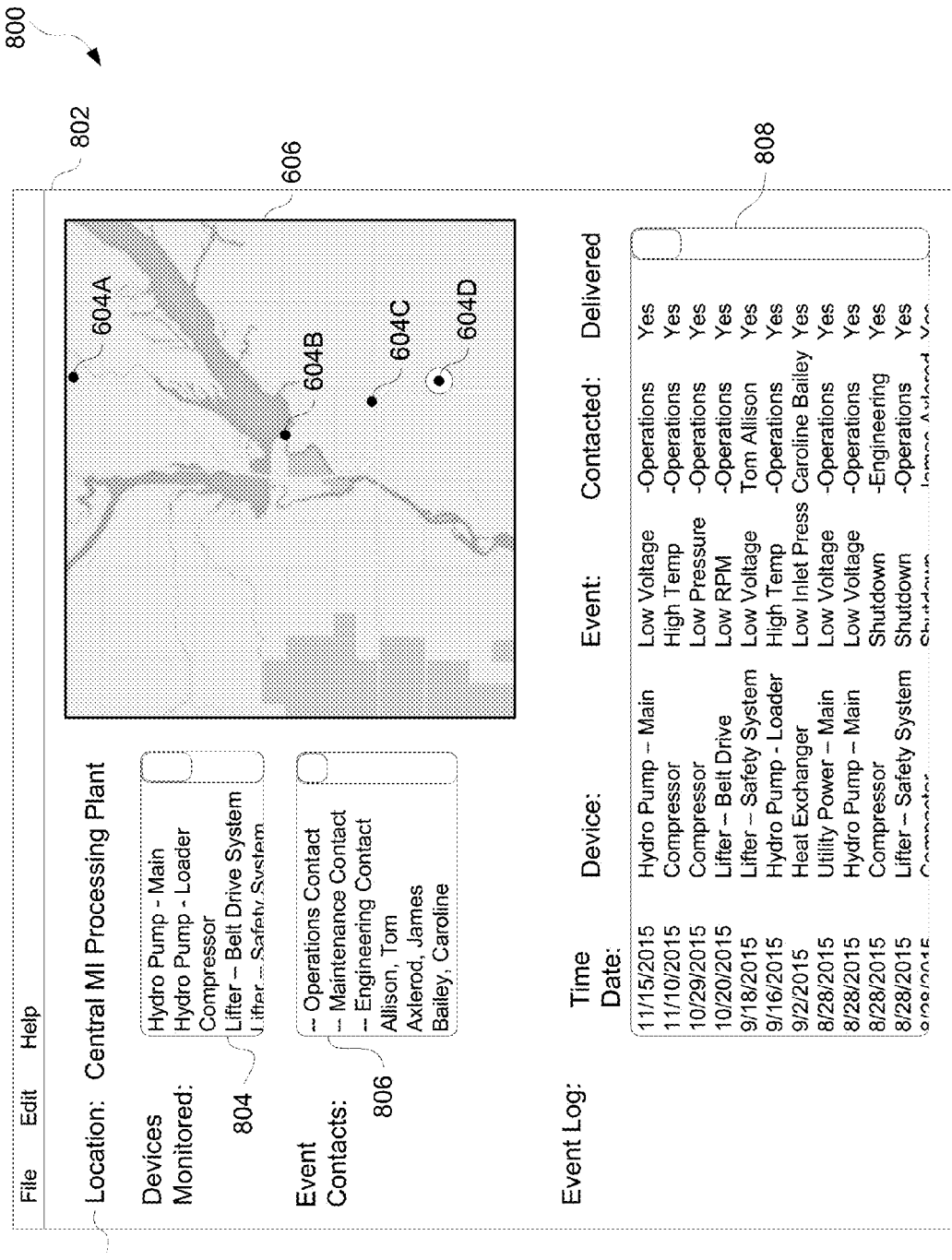

SELF-POWERED CLOUD-BASED WIRELESS STATE-CHANGE NOTIFIER

CROSS REFERENCE TO RELATED APPLICATIONS

This present application claims priority to U.S. Provisional Application No. 62/258,742 filed Nov. 23, 2015, which is hereby incorporated by reference in its entirety.

SUMMARY

Disclosed is a self-contained monitoring device that can be configured to monitor a variety of operating conditions and report specific events to a central cloud-based server that can then broadcast alerts to interested individuals and/or devices. Various types of sensors may be used with the monitoring device configured to sense various parameters. This allows the monitoring device to detect and respond to changes in sense parameters that may include pressure, temperature, humidity, altitude, position, voltage, current, movement, acceleration, rotational speed, geographical location on the earth or, or any other parameter or operating condition of interest.

When an event is detected, the monitoring device may be configured to report the event to a remote cloud-based data collection and distribution server. The remote cloud-based service operating on server connected to a network (e.g. the Internet) can receive reports of various events from multiple monitoring devices and may be configured to distribute reports of these events to particular individuals and/or devices. The individuals or devices may receive reports from the service using various protocols. For example, in response to an alert from a device, the cloud-based service may send a text message to specified devices identifying the monitored equipment, particular operating parameter related to the event, and an indication of the type and severity of the event. The server may be configured with specialized rules programmed to determine which contacts should be notified for specific events related to individual pieces of equipment.

Further forms, objects, features, aspects, benefits, advantages, and embodiments of the present invention will become apparent from a detailed description and drawings provided herewith.

BRIEF DESCRIPTION OF THE DRAWINGS

FIG. 8 illustrates a user interface useful for viewing alert information related to monitoring devices like those illustrated in FIGS. 1-5.

DETAILED DESCRIPTION

Figure 1:
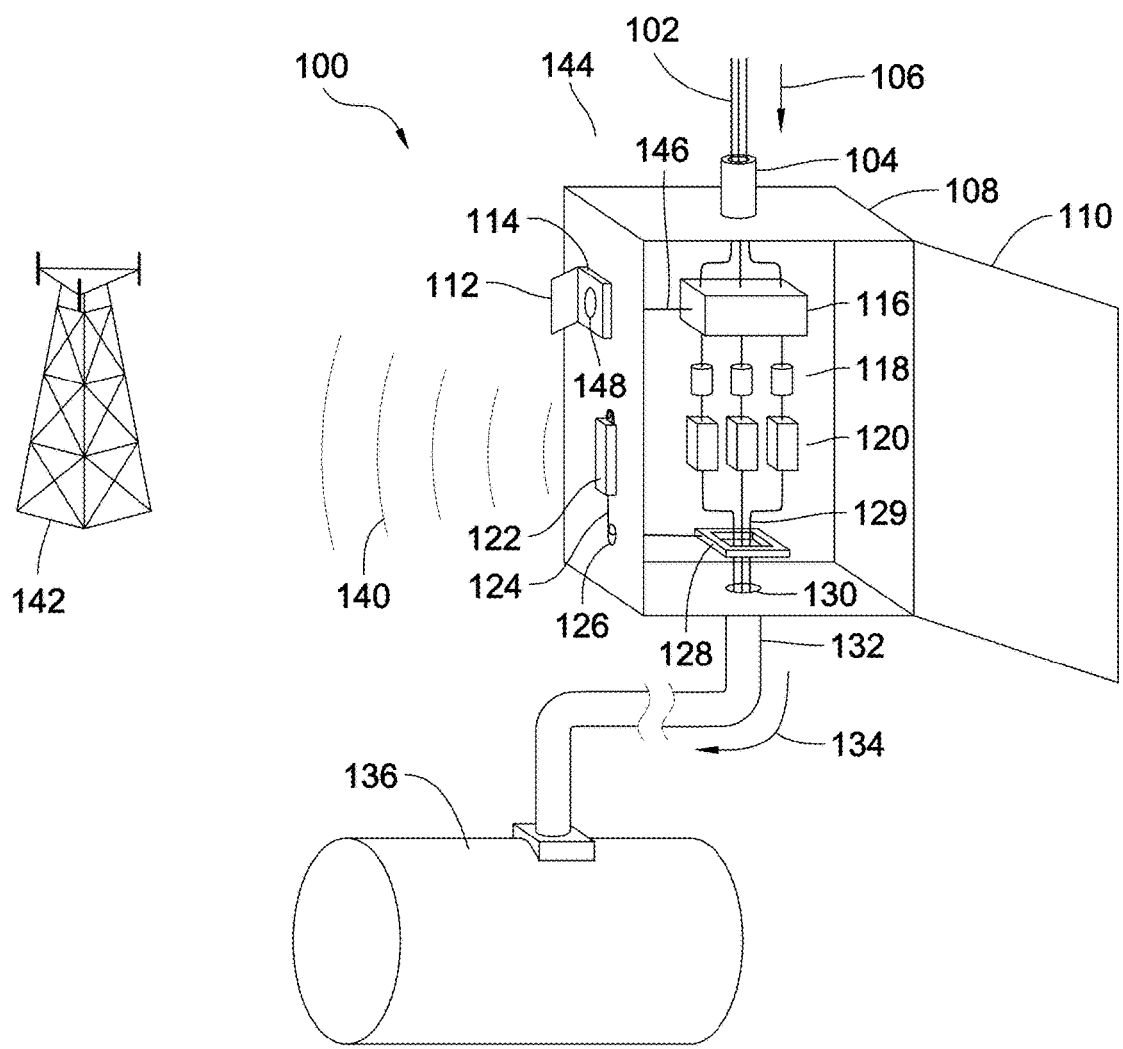
FIG. 1 illustrates one example of an installed monitoring device as disclosed herein.

For the purpose of promoting an understanding of the principles of the invention, reference is made herein to examples illustrated in the drawings and specific language is used to describe the same. No limitation of the scope of the invention is thereby intended. Any alterations and further modifications in the described examples, and any further applications of the principles of the invention as described herein are contemplated as would normally occur to one skilled in the art to which the invention relates. At least one example of the invention is shown in great detail, although it will be apparent to those skilled in the relevant art that some features that are not relevant to the present invention may not be shown for the sake of clarity.

With respect to the organization and description of figures, the reference numerals in the detailed description are organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. Singular forms "a", "an", "the", and the like include plural referents unless expressly discussed otherwise. As an illustration, references to "a device" or "the device" include one or more of such devices and equivalents thereof. Multiple related items illustrated in the drawings with the same part number and are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

As discussed in greater detail herein, the disclosure generally relates to a self-contained monitoring device that can be configured to monitor a variety of operating conditions and report specific events. These reported events can be sent to a central cloud-based server that can then broadcast notification information or alerts to interested individuals and/or devices. Various types of sensors configured to sense various parameters may be used with the monitoring device. This allows the monitoring device to detect and respond to changes in sense parameters that may include pressure, temperature, humidity, altitude, position, voltage, current, movement, acceleration, rotational speed, geographical location on the earth or, or any other parameter or operating condition of interest.

In one aspect, these operating conditions may be related to the operation or behavior of particular machines, systems, or devices. For example, the monitoring device may be used to detect the operation of an electric motor and may be configured to send notifications when the motor loses power, is in danger of overheating, is rotating too fast or too slow, has failed to properly start, and the like. In another example, a monitoring device may be used to monitor the behavior of a pump and may be configured to send notifications when the pump begins to overheat, when the pump output flow rate drops below a target minimum, when the pump is low on coolant, or has shut down because of a loss of power. In yet another example, the monitoring device may detect when the apparatus it is monitoring undergoes rapid acceleration (e.g. the apparatus is dropped or hits another object), stops moving, or has lost the ability to communicate with the cloud-based service.

When an event is detected, the monitoring device may be configured to report the event to a remote cloud-based data collection and distribution server. The remote server may be connected to the Internet in order to receive reports of various events from multiple monitoring devices and may be configured to distribute reports of these events to particular individuals and/or devices. Individuals and/or devices may receive reports from the service using any suitable protocol such as text messaging, push notifications, email, computer-generated telephone calls, and the like. For example, in response to an alert from a device, the cloud-based service may send a text message to specified devices identifying the monitored equipment, particular operating parameter related to the event, and an indication of the type and severity of the event. The server may be configured with specialized rules programmed to determine which contacts should be notified for specific events related to individual pieces of equipment.

Additionally, the system may allow individual users to change the rules used by the service using their own personal computing devices. Users may be able to customize the rules applied to individual personal computing devices so that, for example, only particular emergency notifications are sent to the user's cell phone, while all notifications are sent to the user's tablet computer. This customization functionality may access by interacting directly with the service such as by logging into the service using a web browser, or by changing parameters in an "app" or application that then interacts with the cloud-based service directly.

As mentioned previously, the monitoring device includes aspects like being "event driven" and may be configured to only transmit data when one or more predefined conditions is satisfied. The monitoring device may use small amounts of electrical power from an external power source, directly or indirectly from the circuit or device being monitored, or from a battery physically contained within the device itself. In one aspect, the monitoring device may use less than 20 micro Amperes (Amps) of current, less than 100 micro Amps, or less than 500 micro Amps to name a few non-limiting examples. In one example, a monitoring device may be capable of transmitting event data for over 4600 events without the need for battery recharge or replacement. In another example, a monitoring device may monitor a single event per day for about 10 years on a single battery or battery charge.

In another aspect, a Lithium/Thionyl Chloride battery may be used in the monitoring device to maximize shelf life and monitoring time. The combination of the battery types and circuit designs disclosed can produce an extremely low self-discharge of 1% or less per year allowing the monitoring device to operate without the battery being at peak charge.

Use of the battery technology disclosed herein make it possible for the monitoring device to transmit event information in a broad range of operating environments. The device may include a container and cover that can be hermetically sealed to resist intrusion of dust, water, and the like, and may be operated over a broad range of temperatures such as between −55 degrees C. to +85 degrees C.

In another aspect, the monitoring device may present a uniform low voltage input connection that may be adapted to accept signals from a wide variety of sensing equipment. The monitoring device may be configured to operate in conjunction with various adapter circuits configured to accept input from a sensor and convert the output to signals acceptable by the monitoring device. This configuration can allow the monitoring device to work with electrical devices sensing changes in voltage or current in very low or very high voltage circuits or power lines. In another aspect, the monitoring device can be placed in series with a monitored circuit and can monitor for open circuits in over a mile of wire.

In another aspect, the monitoring device can communicate with a cloud-based server configured to store information about recipients of the events generated by the device as opposed to storing target alert recipient data in the monitoring device itself. Storing event recipient data on a remote server allows users to modify settings for multiple devices, and allows large numbers of recipients such 50 or more, 100 or more, or 500 or more individuals/devices to be contacted at the same time.

In another aspect, the monitoring device can simply sending a "ping" or notification message to the remote server that a noteworthy condition has occurred rather than a fully formatted message indicating. The remote server can be configured to support multiple complex message formats, and can be configured to create new formats that might be useful in the future. Additionally, notification sent by the central server may include engaging Application Programmer Interfaces (APIs) for other third-party remote services or systems to notify them of certain events. Such third-party systems may include news media, social media, or government operated systems configured to accept notification of events in specialized formats. These specialized formats may be stored on the remote server rather than on the monitoring device itself.

In another aspect, the monitoring device may include one or more failover protocols or mechanisms. The monitoring device may be configured to first connect to the remote server through multiple attempts using a first network protocol such as User Datagram Protocol (UDP), waiting some predetermined period of time for a checksum or other acknowledgement from the remote server. If the acknowledgement fails to arrive within the predetermined time period, the monitoring device may be configured to make a second attempt to deliver the critical event condition to the remote server using a second protocol such as via an asynchronous text message over a circuit-switched communications link.

In another aspect, the monitoring devices may retrieve configuration settings from the remote server. Such configuration settings may include time delay intervals, events, software upgrades, and the like. When a monitoring device is activated, it may first fetch updated configuration parameters before sending an event notification. A monitoring device may be configured to "wake-up" and "check-in" for updated parameters at predefined intervals.

One example of an installed event monitor configured to monitor and report on the behavior of a load receiving electrical power is illustrated at 100 in FIG. 1. In this example, power lines 102 carry three-phase alternating current (AC) enter into a power controller 144 carrying current in the direction illustrated at 106. The number of power lines 102, and the method of transmitting power is illustrative and not restrictive. For example power lines 102 may carry direct current (DC), or alternating current on two lines rather than three.

Lines 102 enter the enclosure 108 through an incoming conduit 104 and the enclosure 108 may also include a door 110 which appears in the open position but may be selectively closed to seal enclosure 108. Inside enclosure 108, power lines 102 enter a switch assembly 116 which may be controlled by one or more electric or mechanical control linkages 146. Switch assembly 116 can be controlled by a selector 148 positioned outside enclosure 108 in a separate enclosure 114 with a separate door 112. Optionally, selector 148 may be positioned inside enclosure 108.

Power controller 144 may also include various components such as one or more fuses 118 which may be separately connected electrically in series with individual contacts on switch assembly 116 corresponding to each line 102. Contactors 120 may be included to electronically or mechanically control the flow of current to outgoing lines power lines 129. Lines 129 pass through opening 130 defined by the walls of enclosure 108 and into an outgoing conduit 132. The lines may be electrically connected to a load 136 which may be any suitable device or system consuming electrical power. Examples of loads 136 include pumps, motors, compressors, heating ventilating and air-conditioning units, turbines, engines, computers, buildings, or any other system using electrical energy transferred through outgoing lines 129.

Power flowing through lines 129 may be monitored by a sensor 128. Sensor 128 may be a current clamp, Hall effect sensor, or any other sensor suitable to detect AC or DC current or voltage in lines 129. As shown, sensor 128 is arranged to partially or completely surround all lines 129. In other examples sensor 128 may be positioned around only one, only two, or any other suitable number of lines 129. Signals from sensor 128 can be carried through a signal line 124 which may pass through enclosure 108 via an opening 126. Signal line 124 may be coupled to a monitoring device 122. Monitoring device 122 may be mounted to the outside surface of enclosure 108 as illustrated, or in any other suitable location. Monitoring device 122 can include control logic, processors, memory, transmitting and receiving equipment, a battery for power, or other suitable components as discussed in greater detail herein elsewhere.

The sensor 128 can send a signal indicating a change in the operating condition such as the magnitude or direction of current flowing through lines 129 in the direction 106 and 134. For example, sensor 128 may send signals (or perhaps cease to send a signal) to monitoring device 122 indicating that current flow through lines 129 has stopped, or has dropped below a predetermined threshold. Such a condition may occur during a power outage, or when the flow of power is stopped using selector 148 and/or switch assembly 116. Thus monitoring device 122 may be able to detect when power flow to load 136 is cut off, resumed, or experiences fluctuations.

Monitoring device 122 may report these changes in monitored operating parameters by sending signals 140 via radio transmissions to a wireless communications network 142. One example of such a network is a cell network in which case the local cell receives transmissions from the monitoring device 122. This allows signals 140 to be passed along through the cell network to other devices connected directly or indirectly to communications network 142.

Figure 2:
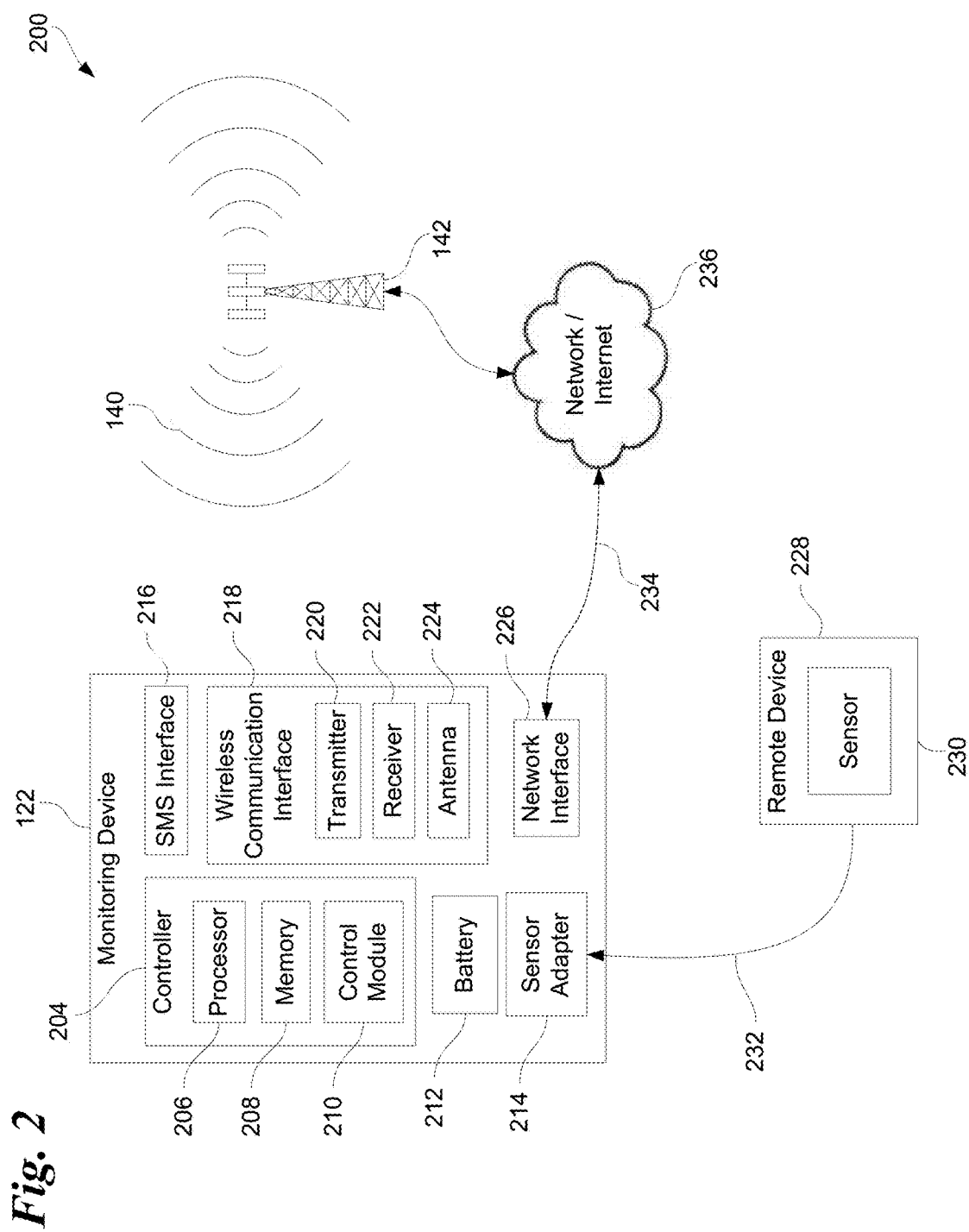
FIG. 2 is a block diagram illustrating additional aspects of a monitoring device like the one in FIG. 1.
Figure 3:
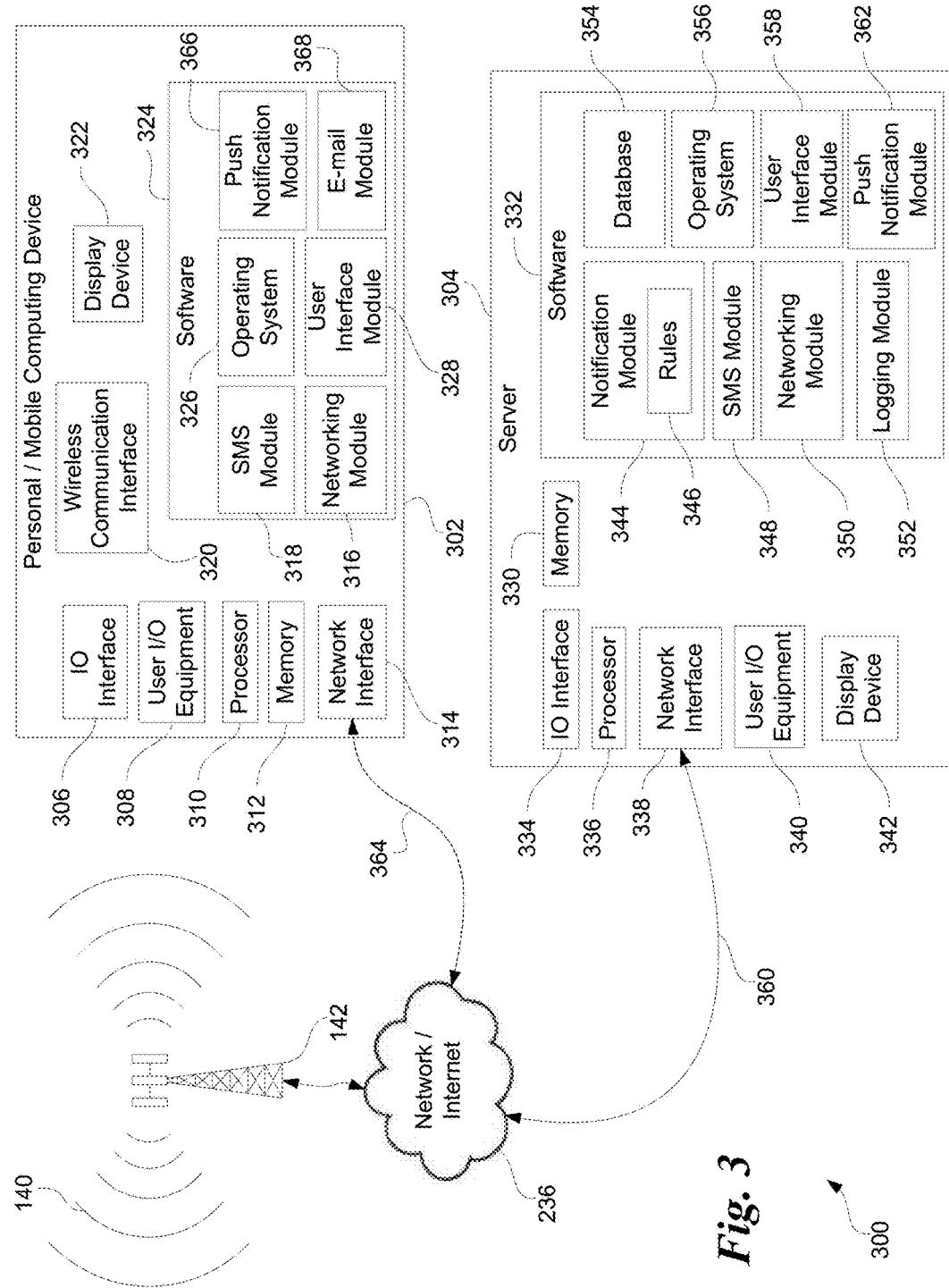
FIG. 3 is a second block diagram illustrating additional aspects a monitoring device like the one in FIG. 1.

Additional components or aspects of the overall monitoring system and device are illustrated in FIGS. 2 and 3. Monitoring device 122 includes a controller 204 for controlling the behavior of device 122 and its interactions with the overall system. Controller 204 may include a processor 206, memory 208, and control module 210 including specific instructions or logical commands that may be executed by processor 206. Also included is a battery 212 configured to provide power to monitoring device 122. A Short Messaging Service (SMS) interface 216 may be included for creating SMS messages that may be sent by monitoring device 122.

A wireless communication interface 218 may be included for communicating with a wireless communications network like network 142. The wireless communication interface 218 may include an antenna 224 configured to resonate according to radio waves carrying signals like signals 140. A transmitter 220 may use antenna 224 to send signals, and a receiver 222 may also use antenna 224 to receive signals. Signals 140 may be sent via any suitable medium such as via radio waves, by light transmission, and the like.

A network interface 226 is included and may implement various communication protocols useful for interacting with remote devices over communications link 234 connected to a network 236 such as the Internet. Communication link 234 may be a wireless communications link implemented using wireless communication interface 218, or a physical communication link implemented using wires, optical fibers, and the like. For example, wireless communication interface 218 may transmit and receive signals 140 which may then be processed according to the protocols and network interface 226 in order to implement communication link 234.

A sensor 230 may be configured to sense various operating conditions or operating parameters of a remote device 228 (one example of which is shown in FIG. 1.) As discussed above, sensor 230 may be configured to detect changes in one or more conditions or parameters such as temperature, pressure, humidity, altitude, power consumption, voltage, current, or any other condition of interest. Sensor 230 may be coupled to monitoring device 122 via a signal line 232. The signal line may be implemented as a physical wire or optical fiber, or other physical conductor or via any suitable wireless communications link.

Because of the variety of sensors 230 that may be used with monitoring device 122, sensor 230 may produce a wide variety of types of signals such as time varying sinusoidal waves, digital pulses, or more sophisticated signals generated using protocols such as the Inter-Integrated Circuit ($I^2C$) protocol, or other similar multi-master, multi-slave, single-ended, serial computer bus protocols. Any suitable sensor 230 may be adapted for use in monitoring device 122 by using a sensor adapter 214. Sensor adapter 214 may be a specialized circuit configured to convert incoming signals from sensor 232 into a standard signal or signaling protocol recognized by monitoring device 122. Thus multiple types of sensors may be used with a single monitoring device 122. Similarly, monitoring device 122 may be configured with minimal software and hardware to adapt to the monitoring needs of a broad array of devices or systems.

In one aspect the control module 210 may include instructions for configuring controller 204 to control monitoring device 122 to send events based on the results of comparing the operating conditions sensed by the sensor 230 to rules encoded in the control logic in control module 210. These operation conditions may be related to the operation or behavior of particular machines, systems, or devices. For example, control logic in control module 210 may be configured to send notifications when sensor input from sensor adapter 214 is received that indicates a change in the operation of an electric motor. Control module 210 may be configured to send a "power lost" event when the motor loses power, a "high temperature" event when the motor is nearly overheating, a "high" or "low" "rotation speed" event when the motor is rotating too fast or too slow, or a "failure warning" messaging indicating an operational failure such as a failure to start up or shutdown properly, or a failure to adjust operation.

In another example, a monitoring device 122 may be used to monitor the behavior of a pump and may be configured to execute logic in control module 210 that configures the controller 204 to send event messages indicating various operational characteristics or activities such as when the pump begins to overheat, when the pump output flow rate drops below a target minimum, when the pump is low on coolant, or has experienced an emergency shut down because of a loss of power. In yet another example, control logic 210 may be configured to cause monitoring device 122 to send messages indicating that the sensor(s) have detected rapid acceleration (e.g. the monitored device has been dropped or has collided with another object), the monitored device has stopped moving, or interfaces 218 and/or 226 have lost contact with network 236 or 142 meaning the monitoring device 122 has lost the ability to communicate with the remote cloud-based service.

Additional aspects of the system are illustrated at 300 in FIG. 3. Event notifications generated by monitoring device 122 may be received via network 236 by a server 304. A server 304 may be any suitable computing device and may include various hardware and software components useful for implementing the collection and dissemination of event information. As illustrated in FIG. 3, server 304 may include an I/O interface 334 for managing input and output with external devices. A processor 336 may be included for executing instructions encoded in software 332. A network interface 338 may be configured to interact with network 236 via a communications link 360. Server 304 may also include user I/O equipment 340 such as keyboards, mice, or other I/O devices. A display device 342 may be included as well for displaying a user interface generated by server 304. A memory 330 may be included as well for temporarily or permanently storing data values or instructions and the like.

Software 332 may include various modules such as a database 354 which may be used to store information about contact information for various individuals or other devices/systems who can have notification information sent to them. Contact information in the contact database 354 may include names, addresses, email addresses, telephone numbers, Internet Protocol (IP) addresses, web service URLs, or any other suitable information useful for contacting an entity interested in receiving event notification information.

Database 354 may also store information about various monitoring devices such as what machines or what aspects of a given machine are being monitored, where the equipment monitored is located, the types of events the monitoring devices will send, and the content of a notification message that is to be sent when a particular event occurs.

An operating system 356 can be included as a software component configuring the basic services and providing a standard set of Application Programmer Interfaces (APIs) for handling basic functions of server 304.

A user interface module 358 may also be provided for generating user interfaces with graphical buttons, windows, text boxes, selection boxes, and other widgets which may be accessible using any suitable input device such as a touch screen, mouse, or keyboard. User interface module 358 may also display various glyphs, figures, icons, graphs, charts, tabular displays, and the like which may or may not be modified or interacted with using any suitable input device. User interface module 358 may be used in conjunction with other software modules to provide navigational control between various presentations of information, to accept character or selection input from an input device, and/or to generate graphical displays of relevant data accessed by other software modules. User interface module 358 may operate in conjunction with operating system 356 which may include libraries of windowing widgets, basic input/output capabilities, and basic file system and network interfaces for user interface module 358 and for other software modules as well.

User interface module 358 may use any suitable technology, programming language, toolkit, API, or protocol to create user interfaces. Module 358 may, for example, generate dynamically created web pages using Hypertext Markup Language (HTML) or other similar markup languages which can be sent to client computing devices via network 236 for viewing in a web browser, or for viewing using customized client apps or applications. Server 304 may also implement various web services responding to messages or requests for information made by client computers seeking information about events, monitored equipment or devices, contacts, notification configuration parameters, or any other information made available by server 304.

An SMS module 348 may be included with software for configuring server 304 to formulate short text messages to be distributed to entities stored in contact database 354 who have requested to receive SMS text message notifications. SMS module 348 may configure server 304 to interact with other servers such as short message service centers or short message gateways to deliver the SMS messages to specific personal computing devices.

A push notification module 362 may be included with software for configuring server 304 two formulate push notification messages to be distributed to entities in contact database 354 who are using an application on a personal computing device that is configured to receive push notifications. Module 362 may configure server 304 to interact with centralized push notification servers using network interface 338, communications link 360, or other suitable communications links.

Networking module 350 may include software for configuring server 304 to establish and maintain communication link 360. Networking module 350 may therefore configure processor 336, network interface 338, I/O interface 334, and any other suitable hardware or software in server 304. Various protocols such as, Transmission Control Protocol/Internet Protocol (TCP/IP), User Datagram Protocol (UDP), Ethernet protocol, or any other suitable networking protocol may be implemented in networking module 350. Any of these protocols may be used to establish a communications link 360 which may then be used to interact with a remote monitoring device 122. Put another way, remote monitoring devices 122 may use any of these protocols, or any other suitable networking protocol to transfer event information to server 304 for distribution.

A logging module 352 may be included in software 332 providing services for recording event related information received from various monitoring devices 122. Such information may include a time when the event was received, specific information about the event such as the severity or type or other information, and any information related to the entities notified of the event.

A notification module 344 may include one or more rules 346 useful for determining what contacts to notify with specific notification information and under what circumstances to do so. Notification module 344 may also access contact database 354 when a rule 346 is triggered indicating a specific contact us to receive specific information for a given event. Notification module 344 may also use SMS module 348, push notification module 362, networking module 352 and/or any other software module to distribute notification information according to rules 346. Notification module 344 may use logging module 352 to maintain a record of notification sent, when they were sent, and to whom, or any other information of interest.

Server 304 may receive and process events from multiple monitoring devices 122. Once processed, the notification information provided is sent to contacts specified in contact database 354. These contacts may receive the notification information for one or more events using a personal or mobile computing device 302. As illustrated in FIG. 3, personal computing device 302 includes various software and hardware components which may be similar in many respects to corresponding software and hardware components in server 304.

Personal computing device 302 may include an I/O interface 306 for managing input and output with external devices and systems such as server 304. A processor 310 may be included for executing instructions encoded in software 324. A network interface 314 may be configured to interact with network 236 via a communications link 364. Personal computing device 302 may also include user I/O equipment 308 such as keyboards, mice, touchscreens, or other I/O devices. A display device 322 may be included as well for displaying a user interface generated by personal computing device 302. With many tablet, smart phone, or desktop personal computing devices, display device 322 may be a touchscreen making it part of the user I/O equipment 308 as well.

A memory 312 may be included as well for temporarily or permanently storing data values or instructions and the like. Personal computing device 302 may also include a wireless communication interface 320 which may be in many respects similar to the wireless communication interface 218 in FIG. 2. Wireless communication interface 320 may therefore include an antenna, transmitter, receiver, and/or other useful equipment configured to send and receive signals 140. In this respect, wireless communication interface 320 may be useful for maintaining a wireless communication link 364 and may interact with network interface 314 as necessary to receive and send information. Wireless communication interface 320 may also be useful for sending and receiving cellular telephone calls such as telephone calls initiated by server 304 as required by specific event notification rules 346.

Software 324 may include various modules for configuring personal computing device 302. An operating system 326 can be included as a software component configuring the basic services offered to other software 324. It may also provide a standard set of Application Programmer Interfaces (APIs) for interacting with various hardware components of personal computing device 302 providing basic functionality to other software 324.

A user interface module 328 may be provided for generating user interfaces with graphical buttons, windows, text boxes, selection boxes, and other widgets which may be accessible using any suitable input device such as a touch screen, mouse, or keyboard. User interface module 328 may also display various glyphs, figures, icons, graphs, charts, tabular displays, and the like which may or may not be modified or interacted with using any suitable input device. User interface module 328 may be used in conjunction with other software modules to provide navigational control between various presentations of information, to accept character or selection input from an input device, and/or to generate graphical displays of relevant data accessed by other software modules. User interface module 328 may operate in conjunction with operating system 326 which may include libraries of windowing widgets, basic input/output capabilities, and basic file system and network interfaces for user interface module 328 and for other software modules as well.

User interface module 328 may use any suitable display technology, programming language, toolkit, API, or protocol to create the user interfaces for personal computing device 302. Module 328 may, for example, interpret and display a dynamically or statically created web page sent from server 304 as Hypertext Markup Language (HTML) and may include a web browser for viewing the results. User interface module 328 may include an app or application operating as a client and connecting to server 304 over network 236 to retrieve data which is then displaying using graphical controls such as buttons, selection boxes, text fields, widgets, and the like.

An SMS module 318 may be included with software 324 for configuring personal computing device 302 to receive short text messages distributed by server 304, or by others. SMS module 318 may configure personal computing device 302 to interact with other servers such as short message service centers or short message gateways to receive the SMS messages specific to a particular personal computing devices 302. SMS module 318 may interact with other modules such as user interface module 328 to display SMS messages according to user preferences.

A push notification module 366 may be included with software for configuring personal computing device 302 to receive push notification messages distributed by server 304, or by others. Push notification module 366 may configure computing device 302 to interact with centralized push notification servers using network interface 314, communications link 364, or other suitable communications links. Push notification module 366 may interact with other modules such as user interface module 328 to display push notifications according to user preferences.

Networking module 316 may include software for configuring personal computing device 302 to establish and maintain communication link 364. Networking module 316 may therefore configure processor 310, network interface 314, I/O interface 306, and any other suitable hardware or software in device 302. Any suitable protocols may be supported by networking module 316 such as Transmission Control Protocol/Internet Protocol (TCP/IP), User Datagram Protocol (UDP), Ethernet protocol, or any other suitable networking protocol. Any of these protocols may be used to establish and maintain communications link 364 which may then be used to interact with server 304. Put another way, server 304 may use any of these protocols, or any other suitable networking protocol to distribute event information to personal computing devices 302, or to other recipient systems.

An email module 368 may be included with software for configuring personal computing device 302 to receive email messages distributed by server 304, or by others. Email module 368 may configure computing device 302 to interact with centralized electronic mail servers using network interface 314, communications link 364, or other suitable communications links. Email module 368 may interact with other modules such as user interface module 328 to display email messages as specified by the user.

Figure 4:
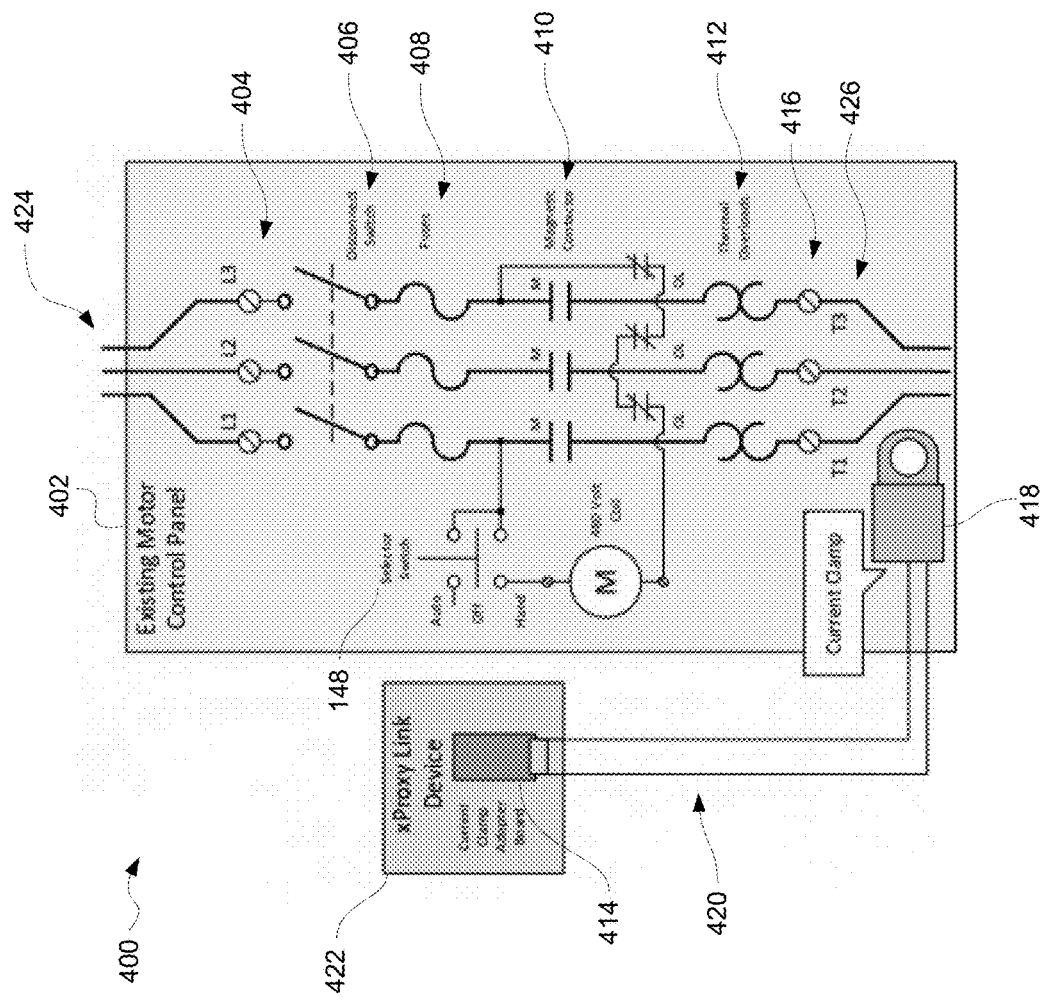
FIG. 4 is schematic diagram illustrating additional aspects of a monitoring device installation like the one in FIG. 1.

Illustrated at 400 in FIG. 4 is a circuit diagram showing additional details of a power controller 402 like power controller 144. In this example, electrical power is introduced through lines 424 which are similar to lines 102 and are coupled to terminals 404. In FIG. 4 and in FIG. 1, three lines 424 and 102 are shown although any number of power lines may be used. Disconnect switch assembly 406 can be connected in series with lines 424 similar to switch assembly 116 in FIG. 1. Disconnect switches in switch assembly 406 may be configured to open and close simultaneously with a single actuating elements such as a lever or switch, or with separate actuators for each individual line 424. One or more fuses 408 may also be present and coupled to switch assembly 406 as illustrated. In this example each fuse is coupled in series to an individual line 424. One or more magnetic contactors 410 are coupled to fuses 408 and are configured as shown to facilitate opening and closing a high-powered circuit where each contactor may be rated for greater than 120 V, greater than 240 V, greater than 480 V, or more, and at current ratings of greater than 15 A, greater than 30 A, greater than 100 A, or greater than 200 A or more. Thermal overload relays 412 may be coupled in contactors 410 to provide thermal overload protection. Such protection may be necessary, for example, when operating a motor to provide overcurrent protection to avoid damage to motor windings and insulation because of excessively high temperatures. Thermal overload relays 412 may be individually coupled to terminals 416. Outgoing lines 426 may be coupled to terminals 416 and configured to carry current to an electrical load like load 136.

A monitoring device 422 is coupled to a current clamp 418 configured to monitor the flow of current leaving power controller 402 via lines 426. Current clamp 418 is one example of the sensor 230 that may be configured similar to the way monitoring device 122 is coupled to power controller 144. The current clamp 418 can detect changes in current through lines 426 and report these changes to an adapter board 414. Adapter board 414 operates like sensor adapter 214 converting signals passed from current clamp 418 to signals recognized by monitoring device 422.

When controller 402 is operating, disconnect switch assembly 406, magnetic contactors 410, and thermal overload relays 412 are closed to allow power from lines 424 to pass through to lines 426. Lines 426 may be connected to an electrical load such as an electric motor. Current clamp 418 generates a flow of electric current through lines 420 corresponding with the flow of power through lines 426 thus monitoring the power delivered to the load.

Monitoring device 422 may be installed in a control like controller 402 or controller 144 by opening any enclosure if present, such as by opening door 110, thus exposing the controller inside. The technician may the open the current clamp 418 and places it around at least one of the lines 426 and without changing the control of the actual motor. The monitoring device 422 or 122 may then be mounted in a location suitable for wireless communication such as on the exterior of the enclosure (if present). Lines 420 or 124 may be passed through a hole like hole 126 defined by the enclosure. The hole may be formed in any suitable manner such as by removing an available knock-out in an enclosure like enclosure 108.

The technician may then activate software on a personal computing device such as an app installed on a smart phone and initiate commands or provide input to configure any customizable alert message that may be related to the supply of electric power through lines 426. Specific message verbiage may be provided using the app, a list of people or other machines to be notified may be selected, and the mode of deliver (i.e. voice, text, email, push, etc.) may be specified along with any other available configuration options.

When sensor 418 (or 128) reports normal operation, the monitoring device 422 may enter an "armed" state, and may indicate this state via one or more display devices such as by a green LED light configured to blink in a first color (such as green) for a predetermined period of time to indicate successful arming. When a failure or fault is detected by sensor 418, monitoring device 422 may blink the same or another LED light in a different color (such as yellow), and transmit an event notification or "ping" message to the remote server 304. The remote server can then respond according to the configuration stored in the server notifying various contacts that as determined by the notification rules.

The adapter board may be configured in any suitable manner to translate output from the sensor to input suitable for monitoring device 422. In one example, current clamp 418 sends a signal to adapter board 414 that is a steady AC wave. As noted above, adapter board 414 may be configured to signal monitoring device 422 when this steady state is initiated. Adapter board 414 may then continue to signal monitoring device 422 in this manner until the AC voltage across lines 420 drops below some predetermined threshold such as less than 1V AC, or less than 0.5V AC to give a few nonlimiting examples. When the voltage from lines 420 falls below a predetermined threshold, adapter board 414 may cease sending a signal to monitoring device 422. Monitoring device 422 can then respond accordingly by contacting a server such as server 304 as discussed herein elsewhere.

Figure 5:
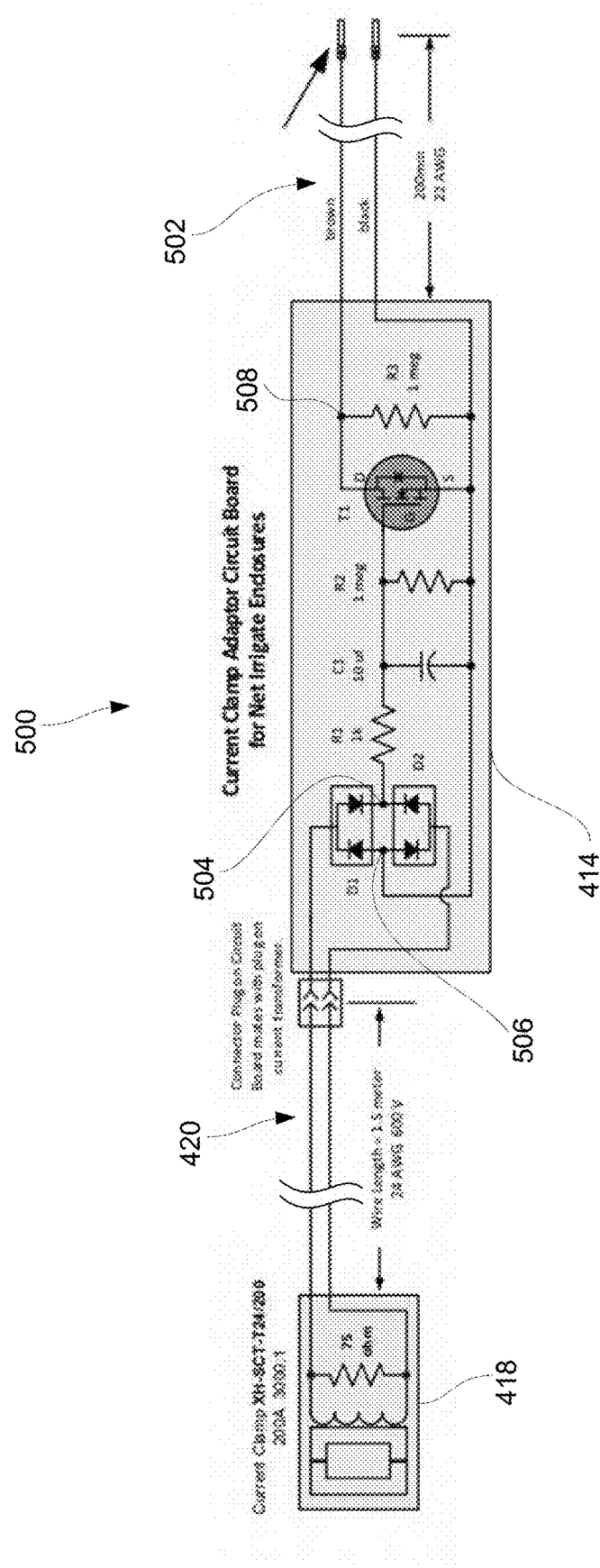
FIG. 5 is a schematic diagram illustrating an adapter for use with a monitoring device like the one in FIG. 4.

An example of an adapter circuit configured to operate in this manner is illustrated in FIG. 5 at 500. Diodes D1 and D2 and Capacitor C1 operate as a rectifier to convert an AC current source from current clamp 418 to a DC current source. Node 504 thus maintains a substantially continuous electric potential that is higher than the potential at node 506. In the steady operating state, current flows through electrical switching device T1, here shown as a Metal Oxide Semiconductor Field-effect Transistor (MOSFET). Current flowing from 504 to 506 flows through T1 from the "gate" to the "source" thus allowing a steady current to also flow from node 508 to node 506 through resistor R3. This substantially steady current flow is thus passed along adapter lines 502 to monitoring device 422 until AC voltage ceases to appear across lines 420.

Monitoring devices like devices 122 and 422 can thus be configured to accept a wide variety of sensors by using the sensor in combination with a specific adapter configured to convert the sensor output to a signal recognized by a monitoring device. This allows the monitoring device to detect a wide range of events and send notification information to a central server like server 304. The central server may be configured to respond accordingly.

Multiple monitoring devices may be configured to monitor and report the condition of multiple individual pieces of equipment, or multiple aspects of a single piece of equipment, or both. A server such as server 304 can thus be configured to accept notification from numerous monitoring devices. This configuration may be accomplished by any suitable means, such as by using a user interface that may include screens or components illustrated in FIGS. 6, 7, and 8. Servers like server 304, or personal computing devices like device 302 may be configured to generate or display any suitable user interfaces using software such as user interface modules 358 and/or 328 working in conjunction with other components of server 304 or personal computing device 302 such as display devices 342 and 322, processors 336 and 310, and/or any other suitable components.

Figure 6:
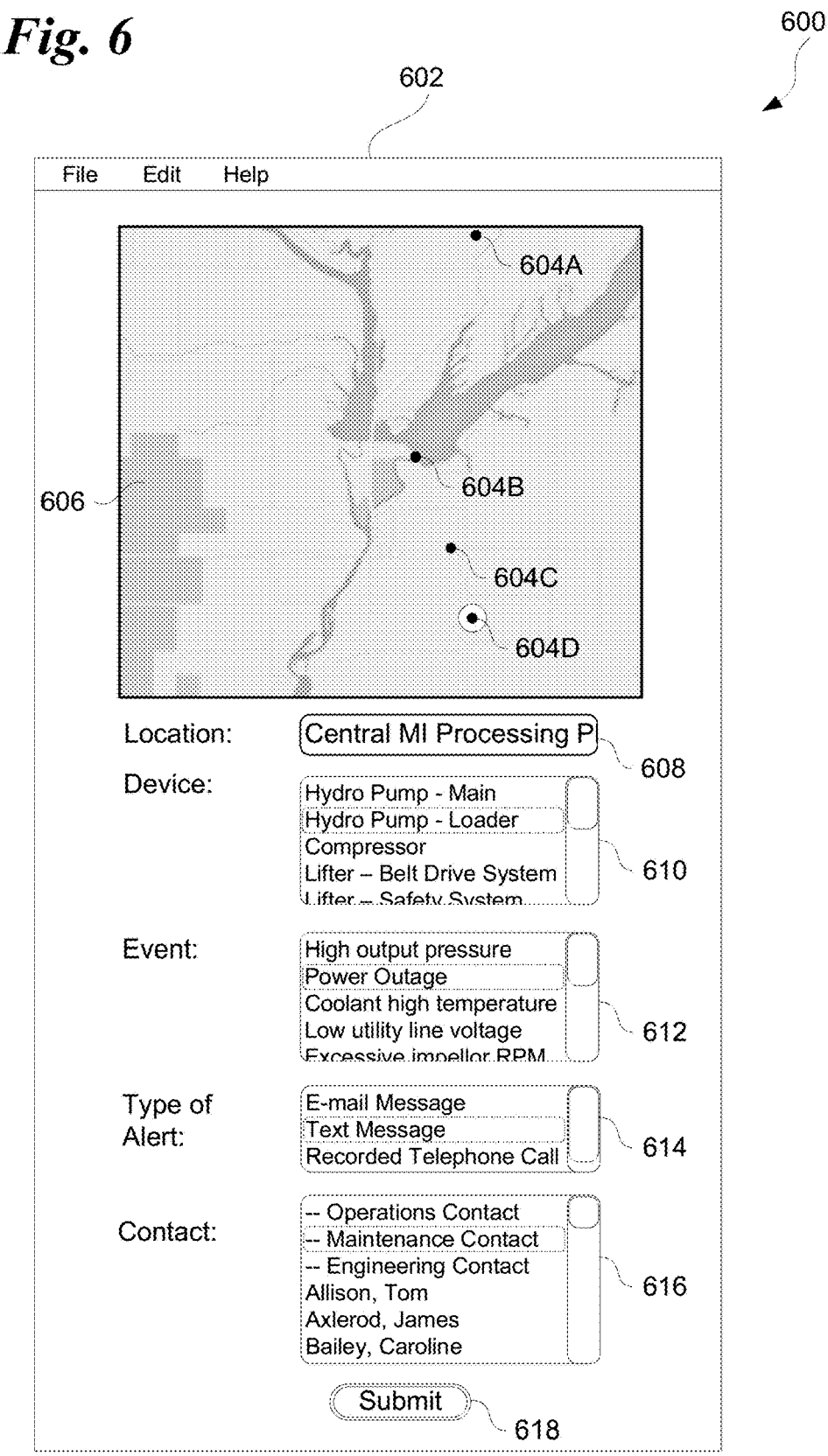
FIG. 6 illustrates a user interface useful for configuring alerts related to monitoring devices like those illustrated in FIGS. 1-5.

User interface 602 shown at 600 in FIG. 6 may include a map display 606 with locations 604A-604D indicating the approximate geographical location of a various monitored equipment, machinery, or other devices. Any type of facility, system, or equipment may be monitored. In this example, 604A represents an oil well and pumping facility, 604B represents a hydroelectric facility at a dam, 604C represents a grain drying and grain storage complex, and 604D represents a crop storage and processing facility. Map display 606 may be generated first allowing the system to accept input from a user indicating which of the available locations they are interested in viewing details about. Other possibilities include input text fields, selection boxes, or other UI controls that allow a user to select one of a number available locations, or to query a database such as database 354. A query may be based on the name of the location, the type of equipment being monitored, the approximate location, and the like.

As illustrated, the user has selected location 604D causing software such as software 332 to query a database like database 354 to obtain details about that specific location. User interface 602 may then be generated using a user interface module like module 358 to provide options like the ones shown. User interface 602 may include a name or location field 608, a field that may be editable as well. A list of monitored devices 610 may be displayed allowing the user to select one or more such devices. As shown, the user has selected "Hydro Pump-Loader" as the device to receive notifications from. A list of the kinds of operational aspects that might be monitored for the hydro pump device are shown at 612. This list may be auto-generated by monitoring devices automatically reporting in to the central server when properly configured, or manually configured by a user entering the relevant details into database 354. In this example, the user has selected to be notified when a power outage occurs.

The types of available notifications that may be sent for a power outage on the hydro pump-loader device is shown at 614. Notifications may be affected by any suitable means such as via SMS text message, e-mail message, by receiving a prerecorded telephone call, or by a push notification to name a few non-limiting examples.

At 616, a list of contacts is shown retrieved from in database 354 that can be associated with this location and type of event. Here the user has selected the role-related contact "Maintenance Contact" to receive the message. This may be configured in the database as one or more actual people who are always notified when particular maintenance related events occur. List 616 may be configured to allow multiple individual recipients as well, or may include other role related contacts such as "Operations" or "Engineering" and the like.

Once the user has made the selections, a "submit" control may be activated by the user to save the configuration. Selecting "submit" in the illustrated interface 602 would mean that individuals defined as "maintenance contacts" would receive a text message notification any time a power outage event occurs for the "hydro pump-loader" device at the Central MI Processing Plant. The contents of the text message may be configured and stored elsewhere in a database (like database 354). A library of various messages may be configured to reduce the time and effort need to set up additional monitoring of similar types of equipment.

Figure 7C:
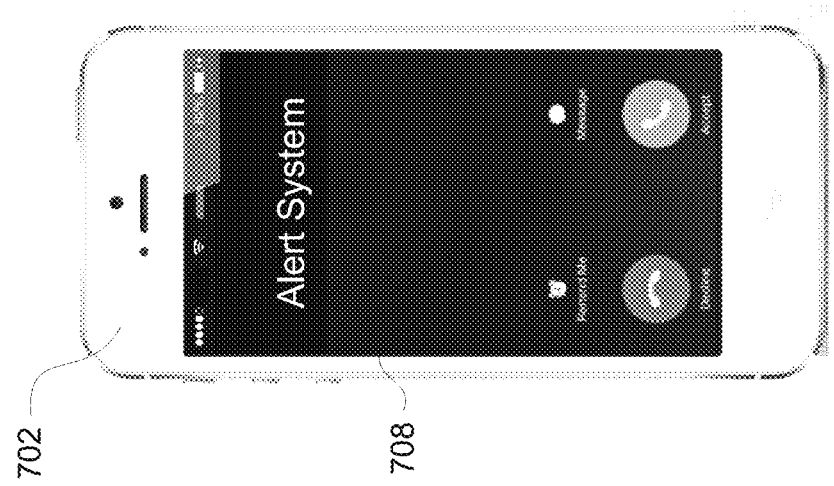
FIG. 7A-7C illustrates examples of event information delivered to a personal computing device from monitoring devices like those illustrated in FIGS. 1-5.
Figure 7B:
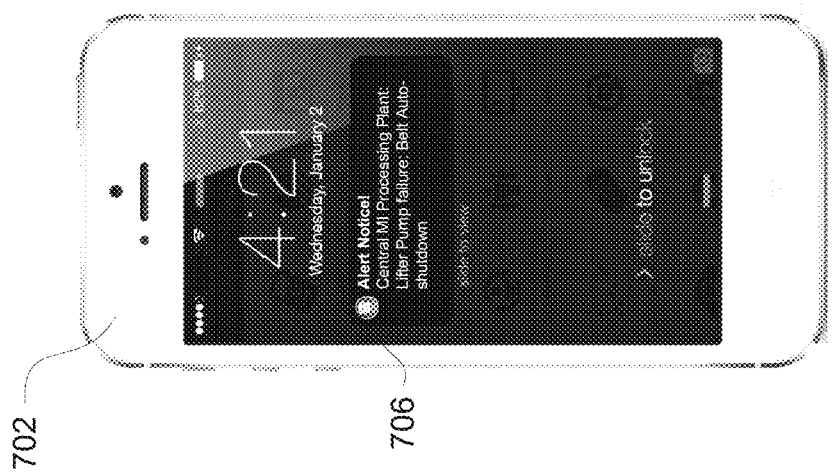
Figure 7A:
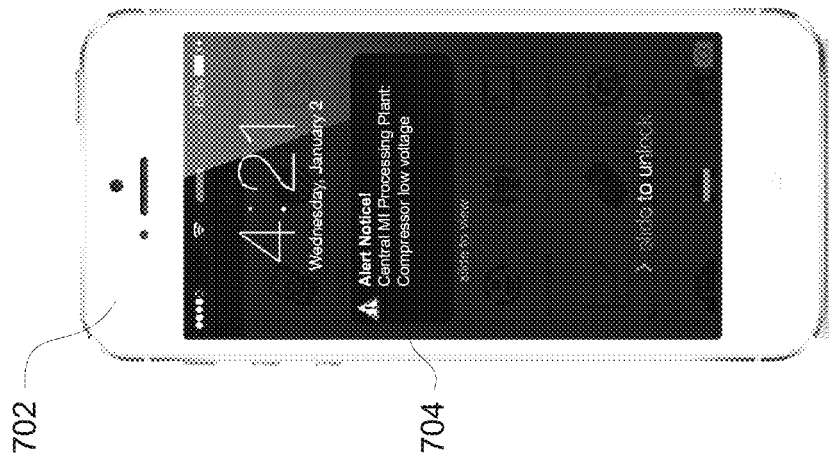

Examples of the messages received by a personal computing device 702 such as a cell phone are shown in FIGS. 7A-7C. In FIG. 7A, device 702 receives the notification as an SMS text message, or a push notification. In 7B, the notification arrives as an e-mail, and in 7C, the notification is delivered to the device 702 as an automated telephone call.

FIG. 8 illustrates at 800 an example of a user interface that provides additional information about events and systems monitored by monitoring devices like device 122. User interface 802 may be generated by software like user interface modules 328 and 358 executing on a server like server 304, or as an app or application executed by a personal computing device like device 302. User interface 802 can include a map display 606 marked with locations 604A-604D. Interface 802 may also include lists of monitored devices 804, and event contacts 806 associated with a selected location shown by name at 816.

One way user interface 802 might be used is by a user who first selects a location like 604D using some kind of user I/O device such as by clicking with a mouse, or touching a touch screen. The user interface may be configured to then engage other software modules, possibly on a remote server like server 304, to retrieve relevant information about the selected location. In this example, 604D is selected and the system has retrieved relevant information about the monitored devices 804 at that location, and information about who can be contacted at 806. A listing of all events reported by any monitoring devices at location 604D is shown at 808.

Selecting any of items in 804, 806, or 808 may provide additional details. For example, selecting a monitored device 804 may result in replacing the event log listing 808 with a listing of all events occurring for the selected monitored device. Selecting a contact 806 may result in displaying all events sent to a given contact in the past, and/or all events that particular contact is configured to receive and how they will receive them. Selecting an event from event listing 808 may cause user interface 802 to display additional information about the event.

Glossary of Definitions and Alternatives

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's and Random House dictionaries. As used in the specification and claims, the following definitions apply to the following terms or common variations thereof (e.g., singular/plural forms, past/present tenses, etc.):

"Antenna" or "Antenna system" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization.

In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data.

Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof.

Antennas may also be configured to radiate electromagnetic energy within a specific range of vertical angles (i.e. "takeoff" angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies.

Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Battery" generally refers to an electrical energy storage device or storage system including multiple energy storage devices. A battery may include one or more separate electrochemical cells, each converting stored chemical energy into electrical energy by a chemical reaction to generate an electromotive force (or "EMF" measured in Volts). An individual battery cell may have a positive terminal (cathode) with a higher electrical potential, and a negative terminal (anode) that is at a lower electrical potential than the cathode. Many types of electrochemical cells have been produced, with varying chemical processes and designs, including galvanic cells, electrolytic cells, fuel cells, flow cells and voltaic piles. When a battery is connected to an external circuit, electrolytes are able to move as ions within the battery, allowing the chemical reactions to be completed at the separate terminals thus delivering energy to the external circuit.

A battery may be a "primary" battery that can produce current immediately upon assembly. Examples of this type include alkaline batteries, nickel oxyhydroxide, lithium-copper, lithium-manganese, lithium-iron, lithium-carbon, lithium-thionyl chloride, mercury oxide, magnesium, zinc-air, zinc-chloride, or zinc-carbon batteries. Such batteries are often referred to as "disposable" insofar as they are generally not rechargeable and are discarded or recycled after discharge.

A battery may also be a "secondary" or "rechargeable" battery that can produce little or no current until charged. Examples of this type include lead-acid batteries, valve regulated lead-acid batteries, sealed gel-cell batteries, and various "dry cell" batteries such as nickel-cadmium (NiCd), nickel-zinc (NiZn), nickel metal hydride (NiMH), and lithium-ion (Li-ion) batteries.

"Cellular Network" or "mobile network" generally refers to a communications link or communications network where the final communications link to an originating sending node or final receiving node in the network is via a wireless link. The cellular network is distributed over land areas ("cells"), each cell served by at least one fixed-location transceiver known as a cell site, base station, or generically, a "cell tower". This base station provides the cell with the network coverage which can be used for transmission of voice, data and other types of communication. In a cellular network, each cell uses a different set of frequencies from neighboring cells, to avoid interference and provide guaranteed bandwidth within each cell.

In a cellular network, switching from one cell frequency to a different cell frequency is done electronically without interruption as various mobile devices with transceivers configured to communicate with the network (i.e. the originating or final receiver nodes) move from cell to cell during an ongoing continuous communication, all generally without a base station operator or manual switching. This is called the "handover" or "handoff." Typically, a new channel is automatically selected for the mobile device on the new base station which will serve it as the mobile device moves around in the cell. The mobile unit then automatically switches from the current channel to the new channel and communication continues. The most common example of a cellular network is a mobile phone (cell phone) network.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication.

In the case of an actual physical link, communication may occur by multiple components in the communication link figured to respond to one another by physical movement of one element in relation to another. In the case of an electrical link, the communication link may be composed of multiple electrical conductors electrically connected to form the communication link.

In the case of an electromagnetic link, the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum.

In the case of a logical link, the communication link may be a conceptual linkage between the sender and recipient such as a transmission station in the receiving station. Logical link may include any combination of physical, electrical, electromagnetic, or other types of communication links.

"Communication node" generally refers to a physical or logical connection point, redistribution point or endpoint along a communication link. A physical network node is generally referred to as an active electronic device attached or coupled to a communication link, either physically, logically, or electromagnetically. A physical node is capable of sending, receiving, or forwarding information over a communication link. A communication node may or may not include a computer, processor, transmitter, receiver, repeater, and/or transmission lines, or any combination thereof.

"Computer" generally refers to any computing device configured to compute a result from any number of input values or variables. A computer may include a processor for performing calculations to process input or output. A computer may include a memory for storing values to be processed by the processor, or for storing the results of previous processing.

A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer.

A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the internet. Thus a computer may include one or more physical processors or other computing devices or circuitry, and may also include any suitable type of memory.

A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer.

The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above.

A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible.

Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

"Data" generally refers to one or more values of qualitative or quantitative variables that are usually the result of measurements. Data may be considered "atomic" as being finite individual units of specific information. Data can also be thought of as a value or set of values that includes a frame of reference indicating some meaning associated with the values. For example, the number "2" alone is a symbol that absent some context is meaningless. The number "2" may be considered "data" when it is understood to indicate, for example, the number of items produced in an hour.

Data may be organized and represented in a structured format. Examples include a tabular representation using rows and columns, a tree representation with a set of nodes considered to have a parent-children relationship, or a graph representation as a set of connected nodes to name a few.

The term "data" can refer to unprocessed data or "raw data" such as a collection of numbers, characters, or other symbols representing individual facts or opinions. Data may be collected by sensors in controlled or uncontrolled environments, or generated by observation, recording, or by processing of other data. The word "data" may be used in a plural or singular form. The older plural form "datum" may be used as well.

"Database" also referred to as a "data store", "data repository", or "knowledge base" generally refers to an organized collection of data. The data is typically organized to model aspects of the real world in a way that supports processes obtaining information about the world from the data. Access to the data is generally provided by a "Database Management System" (DBMS) consisting of an individual computer software program or organized set of software programs that allow user to interact with one or more databases providing access to data stored in the database (although user access restrictions may be put in place to limit access to some portion of the data). The DBMS provides various functions that allow entry, storage and retrieval of large quantities of information as well as ways to manage how that information is organized. A database is not generally portable across different DBMSs, but different DBMSs can interoperate by using standardized protocols and languages such as Structured Query Language (SQL), Open Database Connectivity (ODBC), Java Database Connectivity (JDBC), or Extensible Markup Language (XML) to allow a single application to work with more than one DBMS.

Databases and their corresponding database management systems are often classified according to a particular database model they support. Examples include a DBMS that relies on the "relational model" for storing data, usually referred to as Relational Database Management Systems (RDBMS). Such systems commonly use some variation of SQL to perform functions which include querying, formatting, administering, and updating an RDBMS. Other examples of database models include the "object" model, the "object-relational" model, the "file", "indexed file" or "flat-file" models, the "hierarchical" model, the "network" model, the "document" model, the "XML" model using some variation of XML, the "entity-attribute-value" model, and others.

Examples of commercially available database management systems include PostgreSQL provided by the PostgreSQL Global Development Group; Microsoft SQL Server provided by the Microsoft Corporation of Redmond, Wash., USA; MySQL and various versions of the Oracle DBMS, often referred to as simply "Oracle" both separately offered by the Oracle Corporation of Redwood City, Calif., USA; the DBMS generally referred to as "SAP" provided by SAP SE of Walldorf, Germany; and the DB2 DBMS provided by the International Business Machines Corporation (IBM) of Armonk, N.Y., USA.

The database and the DBMS software may also be referred to collectively as a "database". Similarly, the term "database" may also collectively refer to the database, the corresponding DBMS software, and a physical computer or collection of computers. Thus the term "database" may refer to the data, software for managing the data, and/or a physical computer that includes some or all of the data and/or the software for managing the data.

"Display device" generally refers to any device capable of being controlled by an electronic circuit or processor to display information in a visual or tactile. A display device may be configured as an input device taking input from a user or other system (e.g. a touch sensitive computer screen), or as an output device generating visual or tactile information, or the display device may configured to operate as both an input or output device at the same time, or at different times.

The output may be two-dimensional, three-dimensional, and/or mechanical displays and includes, but is not limited to, the following display technologies: Cathode ray tube display (CRT), Light-emitting diode display (LED), Electroluminescent display (ELD), Electronic paper, Electrophoretic Ink (E-ink), Plasma display panel (PDP), Liquid crystal display (LCD), High-Performance Addressing display (HPA), Thin-film transistor display (TFT), Organic light-emitting diode display (OLED), Surface-conduction electron-emitter display (SED), Laser TV, Carbon nanotubes, Quantum dot display, Interferometric modulator display (IMOD), Swept-volume display, Varifocal mirror display, Emissive volume display, Laser display, Holographic display, Light field displays, Volumetric display, Ticker tape, Split-flap display, Flip-disc display (or flip-dot display), Rollsign, mechanical gauges with moving needles and accompanying indicia, Tactile electronic displays (aka refreshable Braille display), Optacon displays, or any devices that either alone or in combination are configured to provide visual feedback on the status of a system, such as the "check engine" light, a "low altitude" warning light, an array of red, yellow, and green indicators configured to indicate a temperature range.

"Input Device" generally refers to any device coupled to a computer that is configured to receive input and deliver the input to a processor, memory, or other part of the computer. Such input devices can include keyboards, mice, trackballs, touch sensitive pointing devices such as touchpads, or touchscreens. Input devices also include any sensor or sensor array for detecting environmental conditions such as temperature, light, noise, vibration, humidity, and the like.

"Memory" generally refers to any storage system or device configured to retain data or information. Each memory may include one or more types of solid-state electronic memory, magnetic memory, or optical memory, just to name a few. Memory may use any suitable storage technology, or combination of storage technologies, and may be volatile, nonvolatile, or a hybrid combination of volatile and nonvolatile varieties. By way of non-limiting example, each memory may include solid-state electronic Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM).

Memory can refer to Dynamic Random Access Memory (DRAM) or any variants, including static random access memory (SRAM), Burst SRAM or Synch Burst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (REDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM).

Memory can also refer to non-volatile storage technologies such as non-volatile read access memory (NVRAM), flash memory, non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Domain Wall Memory (DWM) or "Racetrack" memory, Nano-RAM (NRAM), or Millipede memory. Other non-volatile types of memory include optical disc memory (such as a DVD or CD ROM), a magnetically encoded hard disc or hard disc platter, floppy disc, tape, or cartridge media. The concept of a "memory" includes the use of any suitable storage technology or any combination of storage technologies.

"Mobile phone" as used herein is synonymous with the terms "cell phone" or "smart phone" all of which refer to a portable telephone which receives or makes calls through a cell of a cellular network. Mobile phones may thus be characterized as nodes in a communications link operating as an originating and/or final receiving node. A cell phone transmits to and receives from a cellular transceiver located in the cell (e.g. at a base unit or "cell tower.") Radio waves are generally used to transfer signals to and from the cell phone on a frequency that is specific (but not necessarily unique) to each cell. A mobile phone may include a computer with memory, processor, display device, input/output devices, and so forth, and thus may be used as, and referred to as, a personal computing device.

"Module" or "Engine" generally refers to a collection of computational or logic circuits implemented in hardware, or to a series of logic or computational instructions expressed in executable, object, or source code, or any combination thereof, configured to perform tasks or implement processes. A module may be implemented in software maintained in volatile memory in a computer and executed by a processor or other circuit. A module may be implemented as software stored in an erasable/programmable nonvolatile memory and executed by a processor or processors. A module may be implanted as software coded into an Application Specific Information Integrated Circuit (ASIC). A module may be a collection of digital or analog circuits configured to control a machine to generate a desired outcome.

Modules may be executed on a single computer with one or more processors, or by multiple computers with multiple processors coupled together by a network. Separate aspects, computations, or functionality performed by a module may be executed by separate processors on separate computers, by the same processor on the same computer, or by different computers at different times.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices.

Computers coupled to a network may be referred to as "nodes" or as "hosts" and may originate, broadcast, route, or accept data from the network. Nodes can include any computing device such as personal computers, phones, servers as well as specialized computers that operate to maintain the flow of data across the network, referred to as "network devices". Two nodes can be considered "networked together" when one device is able to exchange information with another device, whether or not they have a direct connection to each other.

Examples of wired network connections may include Digital Subscriber Lines (DSL), coaxial cable lines, or optical fiber lines. The wireless connections may include BLUETOOTH, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11 (b), 802.11(g), or 802.11(n) to name a few). Wireless links may also include or use any cellular network standards used to communicate among mobile devices including 1G, 2G, 3G, or 4G. The network standards may qualify as 1G, 2G, etc. by fulfilling a specification or standards such as the specifications maintained by International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced.

Cellular network standards may use various channel access methods such as FDMA, TDMA, CDMA, or SDMA. Different types of data may be transmitted via different links and standards, or the same types of data may be transmitted via different links and standards.

The geographical scope of the network may vary widely. Examples include a body area network (BAN), a personal area network (PAN), a local-area network (LAN), a metropolitan area network (MAN), a wide area network (WAN), or the Internet.

A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks.

A network may utilize different communication protocols or messaging techniques including layers or stacks of protocols. Examples include the Ethernet protocol, the internet protocol suite (TCP/IP), the ATM (Asynchronous Transfer Mode) technique, the SONET (Synchronous Optical Networking) protocol, or the SDE1 (Synchronous Digital Elierarchy) protocol. The TCP/IP internet protocol suite may include application layer, transport layer, internet layer (including, e.g., IPv6), or the link layer.

"Output Device" generally refers to any device or collection of devices that is controlled by computer to produce an output. This includes any system, apparatus, or equipment receiving signals from a computer to control the device to generate or create some type of output. Examples of output devices include, but are not limited to, screens or monitors displaying graphical output, any projector a projecting device projecting a two-dimensional or three-dimensional image, any kind of printer, plotter, or similar device producing either two-dimensional or three-dimensional representations of the output fixed in any tangible medium (e.g. a laser printer printing on paper, a lathe controlled to machine a piece of metal, or a three-dimensional printer producing an object). An output device may also produce intangible output such as, for example, data stored in a database, or electromagnetic energy transmitted through a medium or through free space such as audio produced by a speaker controlled by the computer, radio signals transmitted through free space, or pulses of light passing through a fiber-optic cable.

"Personal computing device" generally refers to a computing device configured for use by individual people. Examples include mobile devices such as Personal Digital Assistants (PDAs), tablet computers, wearable computers installed in items worn on the human body such as in eye glasses, laptop computers, portable music/video players, computers in automobiles, or cellular telephones such as smart phones. Personal computing devices can be devices that are typically not mobile such as desk top computers, game consoles, or server computers. Personal computing devices may include any suitable input/output devices and may be configured to access a network such as through a wireless or wired connection, and/or via other network hardware.

"Processor" generally refers to one or more electronic components configured to operate as a single unit configured or programmed to process input to generate an output. Alternatively, when of a multi-component form, a processor may have one or more components located remotely relative to the others. One or more components of each processor may be of the electronic variety defining digital circuitry, analog circuitry, or both. In one example, each processor is of a conventional, integrated circuit microprocessor arrangement, such as one or more PENTIUM, i3, i5 or i7 processors supplied by INTEL Corporation of Santa Clara, Calif., USA. Other examples of commercially available processors include but are not limited to the X8 and Freescale Coldfire processors made by Motorola Corporation of Schaumburg, Ill., USA; the ARM processor and TEGRA System on a Chip (SoC) processors manufactured by Nvidia of Santa Clara, Calif., USA; the POWER7 processor manufactured by International Business Machines of White Plains, N.Y., USA; any of the FX, Phenom, Athlon, Sempron, or Opteron processors manufactured by Advanced Micro Devices of Sunnyvale, Calif., USA; or the Snapdragon SoC processors manufactured by Qalcomm of San Diego, Calif., USA.

A processor also includes Application-Specific Integrated Circuit (ASIC). An ASIC is an Integrated Circuit (IC)

customized to perform a specific series of logical operations is controlling a computer to perform specific tasks or functions. An ASIC is an example of a processor for a special purpose computer, rather than a processor configured for general-purpose use. An application-specific integrated circuit generally is not reprogrammable to perform other functions and may be programmed once when it is manufactured.

In another example, a processor may be of the "field programmable" type. Such processors may be programmed multiple times "in the field" to perform various specialized or general functions after they are manufactured. A field-programmable processor may include a Field-Programmable Gate Array (FPGA) in an integrated circuit in the processor. FPGA may be programmed to perform a specific series of instructions which may be retained in nonvolatile memory cells in the FPGA. The FPGA may be configured by a customer or a designer using a hardware description language (HDL). In FPGA may be reprogrammed using another computer to reconfigure the FPGA to implement a new set of commands or operating instructions. Such an operation may be executed in any suitable means such as by a firmware upgrade to the processor circuitry.

Just as the concept of a computer is not limited to a single physical device in a single location, so also the concept of a "processor" is not limited to a single physical logic circuit or package of circuits but includes one or more such circuits or circuit packages possibly contained within or across multiple computers in numerous physical locations. In a virtual computing environment, an unknown number of physical processors may be actively processing data, the unknown number may automatically change over time as well.

The concept of a "processor" includes a device configured or programmed to make threshold comparisons, rules comparisons, calculations, or perform logical operations applying a rule to data yielding a logical result (e.g. "true" or "false"). Processing activities may occur in multiple single processors on separate servers, on multiple processors in a single server with separate processors, or on multiple processors physically remote from one another in separate computing devices.

"Rule" generally refers to a conditional statement with at least two outcomes. A rule may be compared to available data which can yield a positive result (all aspects of the conditional statement of the rule are satisfied by the data), or a negative result (at least one aspect of the conditional statement of the rule is not satisfied by the data). One example of a rule is shown below as pseudo code of an "if/then/else" statement that may be coded in a programming language and executed by a processor in a computer:

```
if(clouds.areGrey( ) and
(clouds.numberOfClouds > 100)) then {
    prepare for rain;
} else {
    Prepare for sunshine;
}
```

"Triggering a Rule" generally refers to an outcome that follows when all elements of a conditional statement expressed in a rule are satisfied. In this context, a conditional statement may result in either a positive result (all conditions of the rule are satisfied by the data), or a negative result (at least one of the conditions of the rule is not satisfied by the data) when compared to available data. The conditions expressed in the rule are triggered if all conditions are met causing program execution to proceed along a different path than if the rule is not triggered.

"Sensor" generally refers to a transducer configured to sense or detect a characteristic of the environment local to the sensor. For example, sensors may be constructed to detect events or changes in quantities or sensed parameters providing a corresponding output, generally as an electrical or electromagnetic signal. A sensor's sensitivity indicates how much the sensor's output changes when the input quantity being measured changes.

"Sense parameter" generally refers to a property of the environment detectable by a sensor. As used herein, sense parameter can be synonymous with an operating condition, environmental factor, sensor parameter, or environmental condition. Sense parameters may include temperature, air pressure, speed, acceleration, the presence or intensity of sound or light or other electromagnetic phenomenon, the strength and/or orientation of a magnetic or electrical field, and the like.

"Short Message Service (SMS)" generally refers to a text messaging service component of phone, Web, or mobile communication systems. It uses standardized communications protocols to allow fixed line or mobile phone devices to exchange short text messages. Transmission of short messages between a Short Message Service Center (SMSC) and personal computing device is done whenever using the Mobile Application Part (MAP) of the SS7 protocol. Messages payloads may be limited by the constraints of the signaling protocol to precisely 140 octets (140 octets*8 bits/octet=1120 bits). Short messages can be encoded using a variety of alphabets: the default GSM 7-bit alphabet, the 8-bit data alphabet, and the 16-bit UCS-2 alphabet. Depending on which alphabet the subscriber has configured in the handset, this leads to the maximum individual short message sizes of 160 7-bit characters, 140 8-bit characters, or 70 16-bit characters.

While the invention has been illustrated and described in detail in the drawings and foregoing description, the same is to be considered as illustrative and not restrictive in character, it being understood that only a few examples have been shown and described and that all changes, equivalents, and modifications that come within the spirit of the invention are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A remote monitoring system, comprising
    a sealed housing including:
        a sensor responsive to changes in a sense parameter caused by the operation of a monitored device having a motor, the monitored device located outside of said sealed housing, wherein the sense parameter changes according to at least one aspect of the monitored device including the geographic position of the device or whether a motor on the device is presently on or off, and wherein the sensor produces a sensor signal that changes according to variations in the sense parameter;
        a monitoring device that is responsive to the sensor signal, the monitoring device coupled to a communications link, wherein the monitoring device is configured to send an event message with event data corresponding with the sensor signal, and wherein the event message is sent using the communications link; and a battery, free from any electrical power connection, for powering the sensor and the monitoring device;

a server coupled to the communications link, wherein the server is configured to receive the event message sent by the monitoring device using the communications link, and wherein the server is configured to distribute alert messages to one or more recipient computing devices based on one or more notification rules using a processor.

2. The remote monitoring system of claim 1, wherein the one or more event rules includes a threshold rule that is triggered when the sensor signal indicates the sensed parameter is above a predetermined high threshold, or below a predetermined low threshold condition based on the sensor signal.

3. The remote monitoring system of claim 1, wherein the monitored device includes an electrical conductor, wherein the sense parameter is current flowing through the electrical conductor, and wherein the one or more event rules includes a current flow rule that is triggered when the sensor signal indicates the current flowing through the electrical conductor is greater than a predetermined high threshold, or less than a predetermined low threshold based on the sensor signal.

4. The remote monitoring system of claim 1, wherein the monitored device includes a pump, and wherein the sense parameter is a pressure of a fluid flowing through the pump, wherein the sensor is a pressure sensor responsive to the fluid flowing through the pump, and wherein the one or more event rules includes a pressure rule that is triggered when the sensor signal indicates a pressure that is above a predetermined high threshold, or below a predetermined low threshold condition based on the sensor signal.

5. The remote monitoring system of claim 1, wherein the one or more event rules includes a reporting rule that is triggered periodically at substantially regular intervals, and wherein the event data includes a data value of the sensor signal indicating the value of the sense parameter when the reporting rule was triggered.

6. The remote monitoring system of claim 1, wherein the notification rules include an e-mail rule that configures the processor to send an e-mail to members of an e-mail notification list maintained by the server.

7. The remote monitoring system of claim 1, wherein the notification rules include an SMS message rule that configures the processor to send an SMS message to personal computing devices that are included in an SMS notification list maintained by the server.

8. The remote monitoring system of claim 1, wherein the notification rules include a telephone rule that configures the processor to initiate one or more automated telephone calls to one or more members of a telephone contact list maintained by the server.

9. The remote monitoring system of claim 1, wherein the monitoring device includes a wireless communication interface configured to establish and maintain a wireless link to a cellular network, and wherein the communications link to the server includes the wireless link to the cellular network.

* * * * *